Nov. 10, 1942.   C. L. WAINWRIGHT   2,301,764
CHEMICAL-GUN TRAP
Filed Feb. 19, 1941
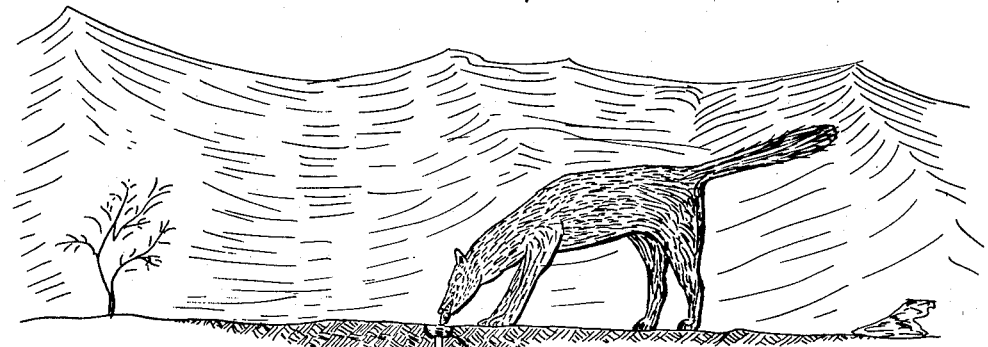
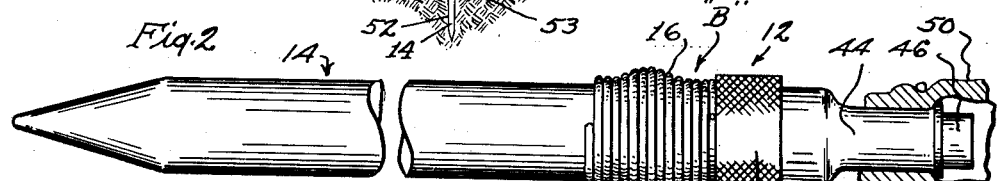
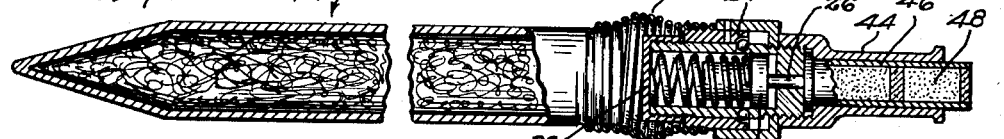
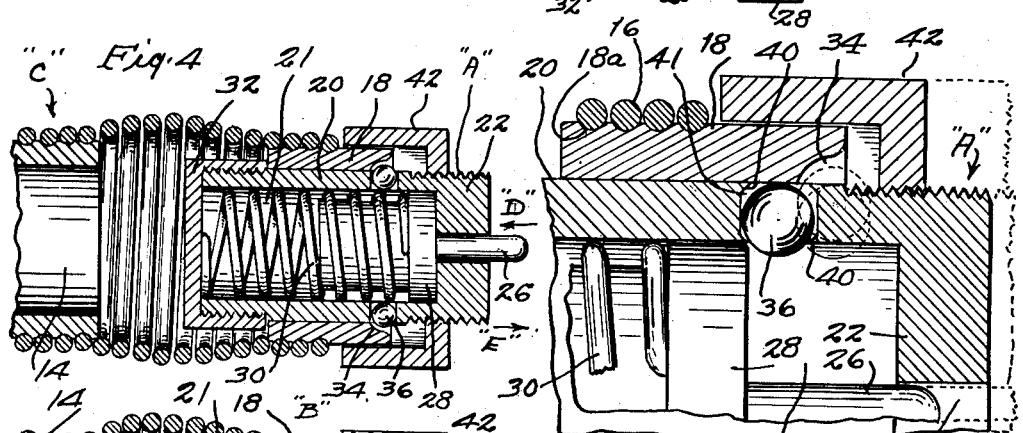
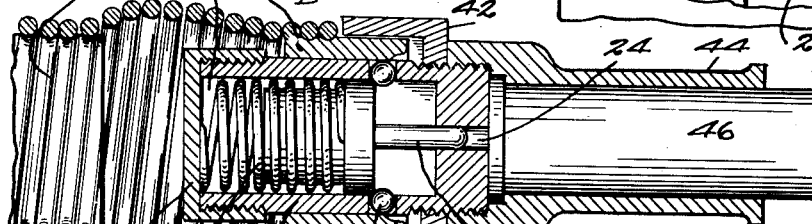
INVENTOR.
Charles L. Wainwright
BY Patented Nov. 10, 1942

2,301,764

UNITED STATES PATENT OFFICE 2,301,764

CHEMICAL-GUN TRAP

Charles L. Wainwright, San Bernardino, Calif.

Application February 19, 1941, Serial No. 379,603

5 Claims. (Cl. 43—84)

The chemical-gun trap of this invention relates to means to destroy certain types of predatory animals which because of their wariness are exceedingly difficult to control and for which most communities as well as divisions of the government offer a bounty for all which are destroyed.

Stock men in general and particularly owners of sheep suffer great financial loss especially at lambing time from marauding activities of coyotes which frequently kill lambs in great numbers in a wanton manner for usually little if any of the victims of the kill are eaten. The coyote is a very shy as well as sly animal insofar as man is concerned and because of its sensitiveness and fear of man is not so frequently seen and hence is difficult to hunt down in the usual manner of hunting. The use of steel traps is only partially satisfactory for oftentimes a trapped animal will chew its leg through in order to release an ensnared foot. Also the use of jawed steel traps is a cruel and inhuman method of catching coyotes or any other type of animal, accordingly I have constructed a gun apparatus which uses a cartridge of the usual percussion type but which employs powdered cyanide as a lethal means.

The preceding data is merely informative of the problem with which this invention is concerned, and it may be stated that the use of a gun fired cyanide charge is not new on my part for the use of this lethal means has been in use for some time, however, cyanide affords a quick and relatively painless death so that the animal thus trapped is expeditiously killed and hence the body or portions thereof can be retrieved for bounty purposes.

Accordingly it is a prime object of the present invention to provide an improved gun to control the discharge of a lethal charge of the type previously referred to.

A further object of the invention is to provide a chemical-gun apparatus of the type under consideration which is weather proof against the action of frost, ice, and snow.

A still further object of the invention is to provide a chemical-gun which can not be tripped into accidental discharge by being casually struck by passing animals.

Another object of the invention is to provide a gun of the character contemplated which is simple, reliable, and positive in operation.

A further object of the invention is to provide a gun apparatus of the character which is cheaply and readily made.

Other objects of the invention may appear from the accompanying drawing, the detailed specification and the accompanying subjoined claims.

In the drawing of which there is one sheet:

Figure 1 is a view illustrative of the manner in which the chemical-gun trap of this invention is planted or installed, and the manner of approach thereto by a predatory animal.

Figure 2 is a side elevation of the gun of this invention showing a fragmental piece of bait attached thereto.

Figure 3 is a sectional view of a substantial portion of the support of the gun apparatus and showing the gun mechanism per se in full longitudinal sectional elevation.

Figure 4 is an enlarged sectional view of the mechanism of the gun, the firing pin is shown in tripped position in this view but without relationship to a cartridge and a detachable barrel within which the cartridge is placed.

Figure 5 is another enlarged view of a detail showing the manner in which certain elements are movable longitudinally upon a pulling pressure or a tug whereby steel balls are moved to a point at which they are free to move laterally to permit a spring pressed firing pin move to strike the percussion cap of the cartridge.

Figure 6 is an enlarged detail showing the gun mechanism in cocked position ready for firing.

The chemical-gun trap of this invention includes two general divisions, first, an operating mechanism 12 and a support 14 therefor, the two elements being joined by an extensile spring 16 so wound as to be tightly secured upon the support 14, in fact the spring turns or convolutions are threadedly secured upon the support in the manner of a nut upon a bolt, while the opposite end of the spring is in like manner threadedly secured upon a sleeve 18 which forms a part of the gun mechanism as will be hereinafter described. The portion of the spring 16 which lies intermediate of the ends thereof is so wound in looseness of turns and diameter thereof as to permit of considerable lateral flexibility.

The operating mechanism of the gun includes a tubular member 20 having an open end, and an end A which is closed by a blank or other closure 22 and this member is formed with an opening 24 through which a firing pin 26 is movable and which opening forms a guide for the pin 26, which as shown in several of the figures is integrally joined with a disc 28 positioned within the tubular member 20. An extensile spring 30 is also positioned in the member 20 and has its one end in contact with the inner side of the disc 28 while the other end thereof bears against a threaded cap 32 screwed upon the exterior of the member 20. The cap thus acts to completely close the tubular member 20 and render the interior thereof substantially weather proof. The relationship of the cap 32 to the tube 20 is such that the end B of the spring 16 clears the cap and its associated tube to permit of relative movement as will be described.

The sleeve 18 fits upon the exterior of the tubular portion 20 with reasonable closeness and is formed with an inner annular cut-away portion at 34 to permit limited extrusion of steel balls 36 from the openings 41 in the walls of the tubular member and from which complete movement is limited by peened edges 40. A cap 42 is threaded upon the outer or free end of the tubular member 20 as shown in Figures 4 to 6 and when in functional position, thread clearance remains on the tube 20 to receive the threaded end of a short barrel 44 adapted to receive a cartridge 46 which is formed in practically identical manner to standard ammunition except that instead of a metallic pellet, the cartridge used in the gun of this invention employs a quantity of powdered cyanide 48.

The preceding matter is believed to be completely descriptive of the physical construction and relative arrangements of mechanical parts employed in making the gun.

A description of its operation will now follow.

The steel balls 36 are first inserted in the openings 41 in the tube 20 and are locked therein by peening the edges as indicated at 40. The firing pin 26 with its disc 28 is then inserted in the bore 21 of the tube 20 and thereafter the spring 30 is likewise placed in abutment with the disc, followed by screwing the cap 32 upon the open end of the tube 20. The sleeve 18 is then slid over the tube 20 with an amount of freedom which permits the cut-away portion 34 to be centrally aligned with the center of the steel balls 36, as shown in Figure 4, and when thus aligned the inner edge of the sleeve 18 is substantially in abutment with the cap 32 which quite naturally extends a small distance outwardly from the outer surface of the tube 20.

The cap 42 is then threaded upon the threaded end A of the tubular portion 20 and when thus positioned the inner surfaces of the cap are in relatively close spaced relation to the sleeve 18, thereby providing a weather seal for the steel balls 36 previously mentioned. The reduced end B of the spring 16 is then threaded upon the sleeve 18 by reason of helical grooves 18a formed in the sleeve. The support 14 is in like manner screwed into the reduced end C of the spring 16 thereby uniting the support 14 and the operating end of the gun as aforementioned so that the gun mechanism 12 may be tugged or pulled laterally in varying degree in conformity with pressure as applied thereto by an animal. Prior to joining the support 14 with the spring as above set forth, the interior of the support is preferably filled with raw wool the pungency of the odor of which is sufficient to deaden foreign odors associated with the steel with which the gun is made.

The gun is now ready for setting and this is accomplished with special tools (not shown) but which are applicable to apply inwardly directed pressure upon the outwardly extending firing pin (see Figure 4) as indicated by the arrow D while at the same time the end A of the tubular portion 20 is held stationary so that the relative motion thereof is in the direction indicated by the arrow E. The application of pressure as thus defined results in moving the disc 28 inwardly thereby forcing the balls 36 outwardly into the accommodation afforded by the cut-away portion 34 in the sleeve 18 and concurrently sliding the tube 20 rearwardly with respect to the sleeve 18 so that the steel balls 36 and the openings 41 within which they are situated are now encompassed by the meanest diameter of the sleeve, however, before this relative movement is obtained, the disc 28 has moved under the balls 36 and occupies a position upon the opposite side thereof.

Since the balls 36 are forced and held inwardly by the sleeve, they are enabled to hold the disc 28 inwardly from spring thrust position, thereby compressing the spring 30 against the cap 32. Upon removal of the tool screwed upon the end A of the tube 20, the barrel 44 with a cartridge 46 therein, is screwed upon the tube 20, thereby completing the loading as well as cocking of the gun.

The assembled gun parts as thus defined are now preferably dipped in melted paraffine to more effectively seal all openings of the gun mechanism against intrusion of moisture. Bait, such as pieces of wool, felt, skin, or flesh, or any other suitable material 50 is then tied over the end of the cartridge and is preferably treated with a type of scent which holds the greatest attraction for the animal sought.

A hole 52 is formed in the ground with a cupped out upper end portion 53 to accommodate the spring 16 and permit lateral movement thereafter the support 14 has been placed in the opening 52 thus provided. Grass or leaves are then lightly placed over and around the spring 16 and within the cupped opening 53 to cover all parts of the gun from sight so that only the strongly scented bait remains above the ground and is accessible to an animal which upon grasping the bait in its teeth and upon an outward pull causes the tubular member 20 to move outwardly relative to the sleeve 18 (which is held against movement by the spring 16 and support 14 driven in the ground) and while this movement is small, continues until the steel balls are aligned with the cut-away portion 34 and are freed from confinement by the sleeve, (see Figure 5) thereby releasing the balls from the oblique directed pressure exerted by the disc 28 and spring 30 so that the firing pin and associated parts are free to be spring thrust against the percussion cap of the cartridge 46.

Explosion of the cartridge follows the preceding operation and discharges the cyanide powder into the open mouth of the animal, causing, as experience has shown, the animal to die almost instantaneously.

It will thus be seen that I have provided a unique gun to administer the lethal effect of cyanide to predatory animals of the type most destructive to sheep and lambs.

The gun is exceedingly simple in construction and is equally reliable in operation although it is completely safe against laterally applied pressure such as may be caused by deer, elk, cattle, sheep, etc., if they should accidentally strike the same with their feet, since only a pressure applied longitudinally of the gun mechanism is effective in releasing the functioning elements thereof. The spring 16 is adapted to permit the part 12 to be moved in any direction in which it is pulled before greater pressure is applied to strip the bait from its position on the gun.

It is conceivable that various changes and modifications may be made in practicing the invention in departure from the particular showing of the drawing and description as given, without however, departing from the true spirit of the invention as defined by the scope of the appended claims, wherefore, the drawing and specification are illustrative only of the invention, while the claims afford a measure of the scope thereof.

I claim:

1. A chemical gun-trap to destroy predatory animals, said gun-trap including a movable cylinder and a relatively immovable sleeve upon said cylinder, a spring pressed firing pin structure in the cylinder, detent means repressible by said sleeve to hold said firing pin in cocked position when the firing pin is moved inwardly of the detent means, a cartridge supporting chamber detachably secured upon said cylinder, an animal lure secured over said cartridge chamber and a cartridge positionable therein, said detent means being spring pressure actuated to release said firing pin for functional use upon occurrence of relative longitudinal movement between said cylinder and sleeve.

2. A chemical gun-trap to destroy predatory animals, said gun-trap including a cylinder and a tubular sleeve upon said cylinder, said cylinder being movable in relation to said sleeve, a spring pressed firing pin structure in the cylinder, a detent, said detent being repressible by said sleeve to hold said firing pin in cocked position when the firing pin is moved inwardly thereof, a cartridge supporting chamber detachably secured upon said cylinder, an animal lure secured upon and over said cartridge chamber and a cartridge positioned therein, said detent being spring pressure actuated to release said firing pin for functional use upon occurrence of relative longitudinal movement between said cylinder and said sleeve, a support, a spring, said spring being adapted to unite said sleeve and said support whereby the sleeve and its associated operating elements are held in longitudinal alignment therewith although yieldable in any lateral direction to absorb shock and permit alignment of the gun-trap with an animal induced pull upon the said movable element.

3. A gun-trap to destroy predatory animals, said gun-trap including a cylinder having a flanged firing pin therein and an immovable sleeve upon the cylinder, said sleeve having an annular recess contiguous with an edge thereof, steel balls, said balls being positioned in openings formed in the walls of the cylinder and being of greater diameter than the wall thickness whereby upon inward movement of the flanged firing pin to cocked position the balls are partially extruded into said recess to permit the flanged firing pin to be repressed within the cylinder to a point upon the opposite side of a plane bisecting the balls, said balls moving inwardly in clearance of the outer surface of the cylinder upon movement thereof relative to the sleeve whereby the firing pin is held in cocked position by the inwardly projecting portions of the balls being in contact with the flange of the firing pin, a cartridge holding barrel detachably positioned upon the sleeve whereby a cartridge may be exploded upon release of said firing pin effected by relative movement of the cylinder and sleeve and concurrent partial extrusion of said balls into said annular recess, and means to support said gun-trap for functional use.

4. In a device of the character described, a closed cylinder having apertures in the side-walls thereof, steel balls in said apertures, a relatively immovable tubular sleeve on said cylinder and having a chamfered edge alignable with said apertures whereby the balls may be periodically partially forced into said chamfered edge in clearance of the inner wall of said cylinder, a firing pin formed with a flange adapted to retain the firing pin in cocked position rearwardly of said balls, spring means to force the flanged firing pin into pressure contact with the balls when the device is cocked, means to limit movement of the cylinder in the sleeve, an explosive element, means to detachably secure the explosive element to the cylinder and in functional relation to said firing pin, a support for the device, and an extensile spring uniting the device and support whereby the device may be inclined in universal lateral directions coincidental with application of a tug upon a lure secured over said explosive element whereby the cylinder is moved relative to the sleeve to carry said balls in to alignment with the chamfered edge of the sleeve to release the firing pin.

5. A gun-trap to destroy predatory animals, said gun-trap comprising a cylinder having a spring pressed firing pin therein, a sleeve upon the cylinder, balls operable within apertures formed in the walls of said cylinder, said balls being alternately movable in clearance of the opposing walls of the cylinder whereby the firing pin may be moved to cocked position and held in such position by portions of said balls which extend inwardly of the inner walls of the cylinder by reason of relative movement of the cylinder and balls to a point at which the balls are encompassed by said sleeve, said firing pin being released by outward movement of said balls to a point in clearance of said firing pin whereby the firing pin is freed from locked engagement therewith and is freed for functional use, and means to cushion said gun-trap against lateral pressure.

CHARLES L. WAINWRIGHT.